(12) United States Patent
Oda et al.

(10) Patent No.: US 6,934,099 B2
(45) Date of Patent: Aug. 23, 2005

(54) DIGITAL DATA REPRODUCING APPARATUS

(75) Inventors: Yoshimasa Oda, Ehime (JP); Shoji Marukawa, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 178 days.

(21) Appl. No.: 10/373,992

(22) Filed: Feb. 25, 2003

(65) Prior Publication Data

US 2003/0210487 A1 Nov. 13, 2003

(30) Foreign Application Priority Data

Feb. 28, 2002 (JP) .................................. 2002-054105

(51) Int. Cl.⁷ .............................................. G11B 5/02
(52) U.S. Cl. .................................... 360/27; 360/51
(58) Field of Search ........................ 360/27, 39, 51, 360/77.12

(56) References Cited

U.S. PATENT DOCUMENTS

| | | | | |
|---|---|---|---|---|
| 4,268,905 A | * | 5/1981 | Johann et al. | 703/13 |
| 5,566,034 A | * | 10/1996 | Shumaker | 360/77.04 |
| 5,760,984 A | | 6/1998 | Spurbeck et al. | |
| 5,796,535 A | * | 8/1998 | Tuttle et al. | 360/51 |
| 6,028,728 A | * | 2/2000 | Reed | 360/51 |
| 6,104,682 A | * | 8/2000 | Konishi | 369/44.34 |
| 6,108,151 A | * | 8/2000 | Tuttle et al. | 360/51 |

OTHER PUBLICATIONS

Patent Abstracts of Japan, for JP 10–64176, published Mar. 6, 1998.
Patent Abstracts of Japan, for JP 2000–48490, published Feb. 18, 2000.
Patent Abstracts of Japan, for JP 9–231506, published Sep. 5, 1997.

* cited by examiner

Primary Examiner—W. R. Young
Assistant Examiner—Adam R. Giesy
(74) Attorney, Agent, or Firm—RatnerPrestia

(57) ABSTRACT

A digital data reproducing apparatus includes, a read head for reading data from a recording medium, an analog-to-digital converter for converting the data read by the read head into digital data, a memory for storing the digital data converted by the analog-to-digital converter, a phase control circuit for controlling phase of the digital data, and off-track detector for detecting off-track of the read head from a track on the recording medium. In the apparatus, storing operation to the memory is controlled based on output signal from the off-track detector and output signal from the phase control circuit.

9 Claims, 10 Drawing Sheets

(a)

(b)

DIGITAL DATA REPRODUCING APPARATUS

FIELD OF THE INVENTION

The present invention relates to a digital data reproducing apparatus for reproducing data recorded on a recording medium such as a magnetic tape, magnetic disk, and optical disk.

BACKGROUND OF THE INVENTION

In these years, increase of memory capacity and improvement in reading accuracy are required in an information recording and reproducing apparatus, and so digital signal processing technology, such as Partial Response Maximum Likelihood (PRML) system, has been introduced in a digital data reproducing apparatus. In regard to phase control in the digital signal processing in which analog signal is converted into digital signal, Japanese Patent Laid-Open No. H09-231506 (corresponding to U.S. Pat. No. 5,760,984) proposes Digital Timing Recovery (DTR) circuit that generates digital data synchronous with the reproduced analog signal by using interpolation from the reproduced digital signal that is sampled asynchronously in an analog-to-digital (A/D) converter.

Here, FIG. 10 shows a configuration example of a conventional digital data reproducing apparatus for reproducing recorded data from signal read from a recording medium. Reproduced analog signal, which is read from a recording medium 100 by read head 101, is sampled in asynchronous with the reproduced analog signal in A/D converter 102, and then converted into reproduced digital signal. Next, the reproduced digital signal is supplied to DTR circuit 104 after digital correction processing in correction circuit 103. Digital data generated in the DTR circuit 104 is supplied to detector 105, and reproduction processing of detected recorded data is performed.

At this time, if off-track state occurs in the reproducing apparatus, amplitude of the reproduced analog signal becomes small and it becomes difficult to maintain phase synchronization. As a result, data reproduction error occurs due to unstable phase control. When the reproducing apparatus returns to on-track state and amplitude of the reproduced analog signal becomes big again, phase control starts, and then phase control becomes stable after a certain period of control delay, and phase synchronization occurs.

Japanese Patent Laid-Open No. H10-64176 discloses a device that is equipped with an off-track detecting circuit for detecting an off-track of a magnetic head and a data buffer memory for storing write data from a host system. In the device, when the off-track detecting circuit detects an off-track during data writing, data is read from the sector that the off-track occurred after the data writing completion, and this read data is compared with the written data stored in the data buffer memory.

Additionally, if there is lack of data in inputted data, data error occurs after the lack portion for a period between a time point when phase synchronization response becomes unstable and a time point when it becomes stable, even if the inputted data itself has no defect. Therefore, when reproducing data error occurs, in order to shorten period of the data error, a method is disclosed in Japanese Patent Laid-Open No. 2000-48490 that processes sampling data in the reverse order that is contrary to the order inputted to phase synchronization signal circuit during the period that phase synchronization response is unstable.

In the above-mentioned conventional digital data reproducing apparatus, however, in regard to the period between a time point when phase control starts and a time point when phase synchronization occurs, data reproduction error occurs due to unstable phase control, though reproduced analog signal with data reproduction capability is inputted. This is because area for phase control is not always prepared when phase control starts at midway point of a track and control gaining is processed utilizing data area, though area for phase control is prepared when data reproduction is performed from the beginning of a track. In these years, track pitch of recording medium is more and more narrowing for actualizing larger recording capacity. In order to record on or reproduce from a recording medium with narrow tracks, extremely precise mechanical accuracy is required, but the realization is becoming difficult. In particular, in a recording and reproducing apparatus with interchangeable media, variation between units has big influence on accuracy. As a result, tracking in reproduction of normally recorded tracking portion becomes unstable, and data reproduction error can occur frequently such as off-track state, or track deflection (or skew) in writing data on a track. In some cases, it cannot be covered by error correction.

SUMMARY OF THE INVENTION

A digital data reproducing apparatus includes, a read head for reading data from a recording medium, an analog-to-digital converter for converting the data read by the read head into digital data, a memory for storing the digital data converted by the analog-to-digital converter, a phase control circuit for controlling phase of the digital data, and off-track detector for detecting off-track of the read head from a track on the recording medium. In the apparatus, storing operation to the memory is controlled based on output signal from the off-track detector and output signal from the phase control circuit.

DETAILED DESCRIPTION OF THE PREFERRED EMBODIMENTS

Hereinafter, preferred embodiments of the present invention are described in detail referring to the accompanying drawings.

(The First Embodiment)

The first preferred embodiment is described with reference to FIGS. 1, 5, and 8.

Figure 1:
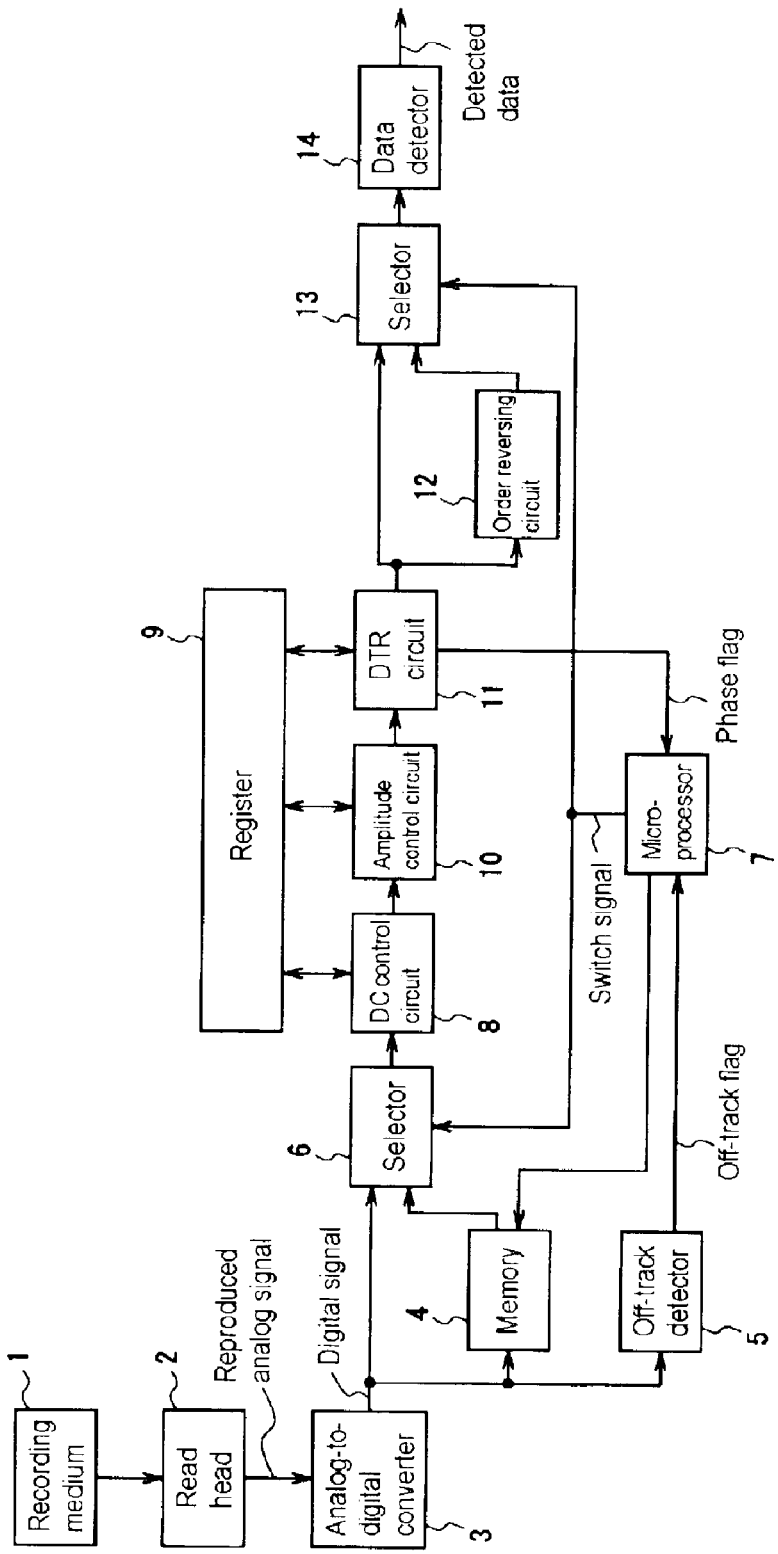
FIG. 1 is a block diagram showing a configuration of digital data reproducing apparatus according to a first exemplary embodiment of the present invention.

FIG. 1 is a diagram showing a configuration of a digital data reproducing apparatus of the first exemplary embodiment according to the present invention.

In FIG. 1, a read head 2 reads recorded data from a recording medium 1 and outputs the reproduced analog signal to an analog-to-digital (A/D) converter 3. The A/D converter 3 samples the analog signal by an asynchronous sampling clock for the analog signal, converts the sampled analog signal into a digital signal, and then outputs the digital signal to memory 4, off-track detector 5, and selector 6.

The memory 4 stores the digital signal supplied from the A/D converter 3 when a store command is given from microprocessor 7, which is used as a control unit, and outputs the stored digital signal in an order contrary to the order in which the digital data is stored into the memory 4 when a read command is given from the microprocessor 7. For example, when N pieces of input signal are stored in order from m(0), m(1), ... m(N-1), output is made in order from m(N-1), ... m(1), m(0) in reverse.

The off-track detector 5 detects off-track state using the digital signal supplied from the A/D converter 3, and then outputs a detection result to the microprocessor 7 as an off-track flag signal (off-track flag). In this off-track detection method, amplitude of the digital signal is compared with a predetermined threshold. When the condition that amplitude of the digital signal is smaller than the threshold continues, it is determined that the read head 2 is in off-track state. Off-track flag supplied from the off-track detector 5 is "1" in off-track state and "0" in on-track state.

Particularly, in case if the recording medium 1 is a magnetic tape, normally azimuth recording is applied, and it is possible to detect deviation of a track acutely. When the read head 2 is wider than a record track width, decrease in amplitude of digital signal is small even if the head is displaced, so it doesn't become a problem. However, as recording density increase, when head width of the read head 2 becomes the same or less than a track width, data processing at off-track state becomes a problem. In a configuration that error is detected only at beginning and end of each track and tracking is fixed in middle of the track, more effective reproduction processing is obtained to the track bending etc. in middle of a track. In addition, when azimuth recording is used, it is possible to detect off-track state accurately because there is few influence of an adjacent track.

The selector 6 selects either output from the A/D converter 3 or output from the memory 4 based on switch signal, which is supplied from the microprocessor 7, and supplies the selected output to Direct Current Control Circuit (DCCC) 8. When switch signal is "0", the selector 6 selects digital signal supplied from the A/D converter 3, and when switch signal is "1", the selector 6 selects digital signal supplied from the memory 4.

The microprocessor 7 controls the entire apparatus by issuing various commands including switch signal that is supplied to the selectors 6 and 13. The microprocessor 7 determines switch signal based on off-track flag, which is supplied from the detector 5, and phase flag signal (phase flag), which is supplied from DTR circuit 11. When off-track flag is "0", the microprocessor 7 sets switch signal to "0" and then outputs the switch signal to the selector 6 and the selector 13. When off-track flag is "1", switch signal is set to "1", and then outputted to the selectors 6 and 13. In addition, when the off-track detector 5 detects on-track state (off-track flag is "0"), the microprocessor 7 controls the apparatus to process digital signal supplied from the A/D converter 3, and when off-track state is detected (off-track flag is "1"), the microprocessor 7 controls the apparatus to process digital signal stored in the memory 4.

The direct current control circuit (DCCC) 8 removes direct current (DC) component from digital signal selected by the selector 6, outputs DC correction value to register 9, and also outputs the digital signal without DC component to amplitude control circuit (ACC) 10.

Here, the DCCC 8 is described in detail with reference to FIG. 5. FIG. 5 is a diagram showing configuration of the DCCC 8.

Figure 5:
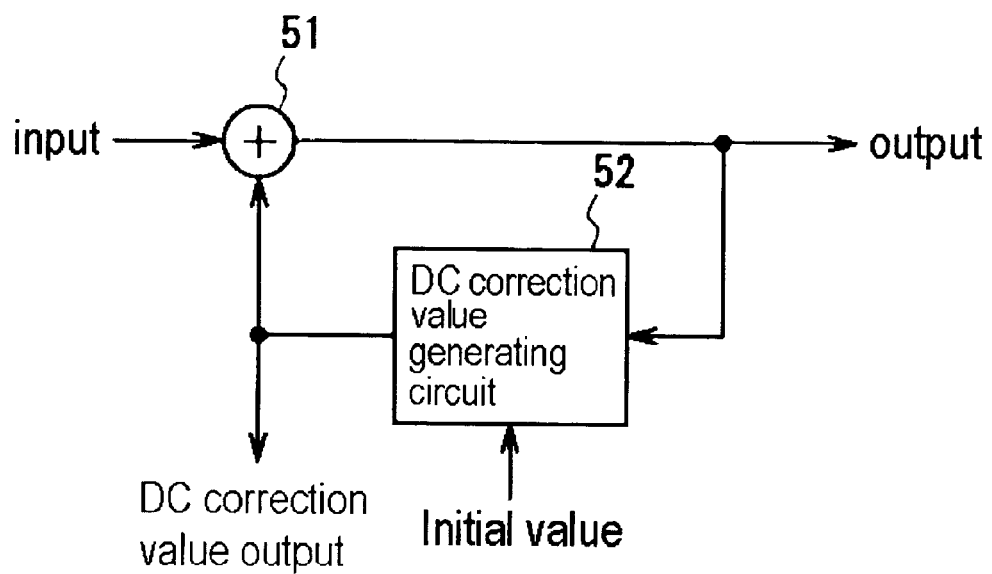
FIG. 5 is a block diagram showing a configuration of a direct current control circuit.

In FIG. 5, the DCCC 8 includes adder 51 and direct current (DC) correction value generating circuit 52. The DC correction value generating circuit 52 detects DC component from output signal of the adder 51, generates DC correction value, and then outputs the DC correction value to the register 9 and the adder 51. Next, the adder 51 adds DC correction value to a signal inputted, removes DC components, and then outputs to the ACC 10. Start timing of DC control processing of the DCCC 8 is controlled by the microprocessor 7. Initial value that the register 9 outputs is used as a DC correction value at the beginning of DC control.

On receiving a store command from the microprocessor 7, the register 9 stores DC correction value supplied from the DCCC 8, amplitude correction value supplied from the ACC 10, and frequency correction value supplied from the DTR circuit 11. Then, the register 9 outputs each stored value to the DCCC 8, the ACC 10 and the DTR circuit 11 respectively.

The ACC 10 corrects amplitude variation of the signal supplied from the DCCC 8 and outputs amplitude correction value to the register 9, and outputs digital signal with corrected amplitude variation to the DTR circuit 11.

Figure 6:
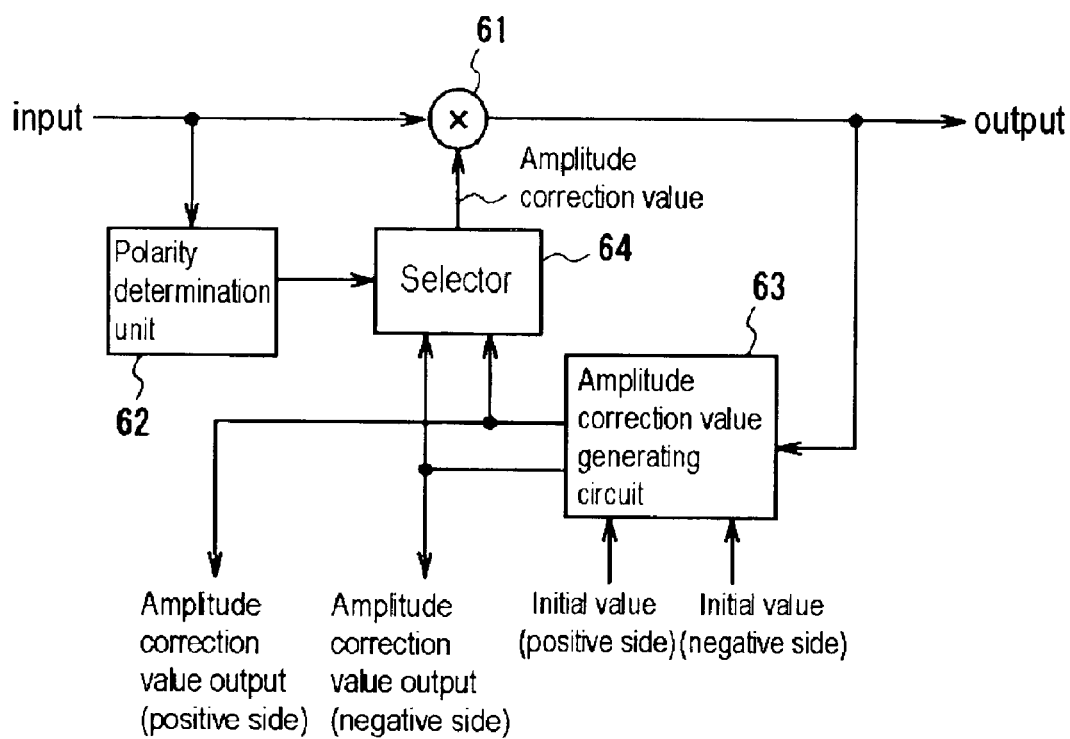
FIG. 6 is a block diagram showing a configuration of a amplitude control circuit.

Here, the ACC 10 is described in detail with reference to FIG. 6. FIG. 6 is a diagram showing configuration of the ACC 10.

In FIG. 6, the ACC 10 includes multiplier 61, polarity determination unit 62, amplitude correction value generating circuit 63, and selector 64. The amplitude correction value generating circuit 63 detects amplitude level of output signal from the multiplier 61 and finds difference between amplitude level of the output signal from the multiplier 61 and target level. In addition, the amplitude correction value generating circuit 63 compares amplitude level of output signal from the multiplier 61 in positive side and that in negative side. Then, the amplitude correction value generating circuit 63 generates amplitude correction value both in the positive side and in the negative side respectively and outputs the amplitude correction value to the selector 64 and to the register 9 so that amplitude correction can be made separately in the positive side and in the negative side if asymmetry exists. The polarity determination unit 62 determines polarity of input signal and outputs the result to the selector 64. Based on the determination of the polarity determination unit 62, the selector 64 selects and outputs amplitude correction value either in positive side or in negative side to the multiplier 61. The multiplier 61 multiplies the selected amplitude correction value by input signal for controlling amplitude and outputs the calculated result to the amplitude correction value generating circuit 63 and the DTR circuit 11. Control start timing of the ACC 10 is controlled by the microprocessor 7, and initial value that register 9 outputs is used as a amplitude correction value in the positive side and in the negative side at the beginning of amplitude control.

The DTR circuit 11 controls frequency and phase of a signal supplied from the ACC 10. In addition, the DTR circuit 11 outputs frequency correction value to the register 9, outputs phase synchronization information as phase flag to the microprocessor 7, and outputs digital signal with controlled phase to order reversing circuit 12 and the selector 13.

Figure 7:
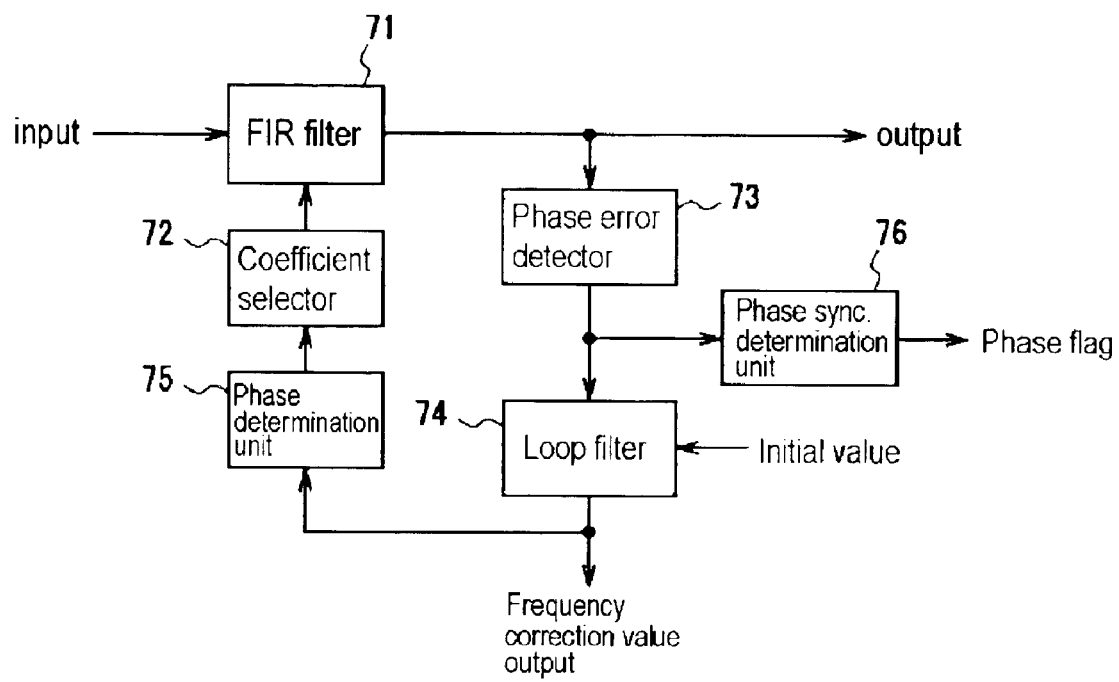
FIG. 7 is a block diagram showing a configuration of a digital timing recovery circuit.

The DTR circuit 11 is described in detail with reference to FIG. 7 here. FIG. 7 is a diagram showing configuration of the DTR circuit 11.

In FIG. 7, the DTR circuit 11 includes FIR filter 71, coefficient selector 72, phase error detector 73, loop filter 74, phase determination unit 75 and phase synchronization determination unit 76.

The FIR filter 71 carries out convolution calculation of signal supplied from the ACC 10 and interpolation coefficient supplied from the coefficient selector 72 and outputs the calculation result to the phase error detector 73, the selector 13 and the order reversing circuit 12. The phase error detector 73 detects phase error between phase of the above mentioned digital signal and a reference phase corresponding to an amplitude value at a predetermined sample point from signal supplied from FIR filter 71, and outputs the detected phase error to the phase synchronization determination unit 76 and the loop filter 74. The loop filter 74 generates frequency correction value from the phase error supplied from the phase error detector 73 and outputs the frequency correction value to the phase determination unit 75 and the register 9. The phase determination unit 75 determines phase correction value of each clock from frequency correction value supplied from the loop filter 74, and outputs the phase correction value to the coefficient selector 72. The coefficient selector 72 has an interpolation coefficient table, from which a group of interpolation coefficient corresponding to a phase correction value supplied from the phase determination unit 75 is selected and outputted to the FIR filter 71.

That is, in Partial Response Maximum Likelihood (PRML) system, a desired synchronized sampling data is generated by using interpolation from asynchronous sampled data. Concretely, amplitude of the sample data at zero cross point in PRML system is detected, and in order to make inclination of the phase change corresponding to the amplitude be a predetermined value, interpolation (phase rotation) is done by the FIR filter 71 because the inclination expresses a deviation of frequency.

The interpolation coefficient table is stored in the coefficient selector 72 and making the phase correction value corresponding to interpolation coefficient. Supposed interpolation coefficient is represented by Cn and phase correction value is represented by δ interpolation coefficient Cn can be found by the following mathematical formula 1:

$$Cn(δ) = (\sin(δx(nT-δ))/(δx(nT-δ)) \quad (1)$$

wherein n=0, 1, 2, . . . .

Interpolation coefficient table is gained by seeking coefficient of each tap per phase correction value using mathematical formula 1, as described above.

The phase synchronization determination unit 76 determines phase synchronization from phase error supplied from the phase error detector 73, and outputs phase flag "1" when phase control is stable and phase flag "0" when phase control is unstable to the microprocessor 7. In other words, when phase (of synchronized portion) of the digital signal with DC control and amplitude control, and phase of predetermined reference signal are locked, phase flag becomes "1". In addition, phase control start timing of the DTR circuit 11 is controlled by the microprocessor 7, and initial value supplied from the register 9 is used as frequency correction value at beginning of phase control.

As described above, correction means of digital signal including DC control circuit, amplitude control circuit, and DTR circuit, performs DC control, amplitude control, and phase control in DTR, and then correction values as of when correction control is stable are stored in the register 9.

The order reversing circuit 12 changes order of signal supplied from the DTR circuit 11 to the reverse order and then outputs to the selector 13.

The selector 13 selects output signal either from the DTR circuit 11 or from the order reversing circuit 12 based on switch signal supplied from the microprocessor 7, and outputs to the data detector 14. In addition the selector 13 selects output signal from the DTR circuit 11 when switch signal is "0" (that is off-track flag is "0"), and selects output signal from the order reversing circuit 12 when switch signal is "1" (that is off-track flag is "1".)

The data detector 14 digitalizes digital signal selected by the selector 13, and outputs the detected recorded data to a next stage.

Operation of the digital data reproducing apparatus configured as described above will be explained below.

Normally, in reproduction processing of digital signal supplied from the A/D converter 3, switch signal is set to "0", and recorded data is detected from the digital signal supplied from the A/D converter 3 using the DCCC 8, the ACC 10 and the DTR circuit 11. On the other hand, in reproduction processing of digital signal stored in memory 4, switch signal is set to "1", and recorded data is detected from the digital data signal stored in the memory 4 using the DCCC 8, the ACC 10, the DTR circuit 11, the order reversing circuit 12 and data detector 14.

Next, storing operation of digital signal in the memory 4 is explained.

When off-track flag supplied from the off-track detector 5 is changed from "1" to "0", that is to say when condition of the read head 2 is changed from off-track to on-track, the microprocessor 7 issues a store command to the memory 4 and digital signal supplied from the A/D converter 3 is recorded in the memory 4. Then, when phase flag supplied from the DTR circuit 11 is changed from "0" to "1", in other words, when all of DC control, amplitude control and phase control become stable respectively, the microprocessor 7 issues stop command for stopping storing operation to the memory 4 and storing operation of memory 4 stops. After that, when off-track flag is changed from "0" to "1", that is to say, track condition of read head 2 is changed from on-track to off-track, the microprocessor 7 issues a read command to the memory 4 and digital signal stored in the memory 4 is read from the memory 4 and outputted to the selector 6.

Next, reproduction processing of digital signal stored in the memory 4 is explained.

Digital signal stored in the memory 4 is outputted in an order contrary to the order in which the digital signal is stored into the memory 4. Therefore, order of the signals supplied to the DCCC 8, the ACC 10 and the DTR circuit 11 from the memory 4 is contrary to the order of the digital signal supplied from the A/D converter 3. That is, in the DCCC 8, the ACC 10 and the DTR circuit 11, the digital signals supplied from the memory 4 is processed in an order contrary to the order of control processing of the digital signal supplied from the A/D converter 3. On that account, output signal of the DTR circuit 11 becomes reverse phase synchronized signal in time order to digital signal supplied from the A/D converter 3. This signal outputted from DTR circuit 11 is reversed its order in the order reversing circuit 12 to the original order that is same as the order of the digital signal supplied from the A/D converter 3, and supplied to data detector 14 via selector 13 to detect recorded data.

Furthermore, control of the DCCC 8 and the ACC 10 are performed depending on only signal amplitude direction. Therefore, even if input signal is in reverse order, change of circuit configuration is not required. Also regarding the DTR circuit 11, phase control is possible without changing circuit configuration because direction of frequency correction is the same and because interpolation coefficient of interpolation coefficient table in coefficient selector 72 has symmetric value in phase lead and phase lag in nyquist interpolation of DTR circuit 11.

Hereinafter, in reproduction processing of stored signal in memory 4, initial value settings at control start of the DCCC 8, the ACC 10 and the DTR circuit 10 are described. When phase flag is changed from "0" to "1" after off-track flag is changed from "1" to "0", microprocessor 7 issues a store command for storing correction values of the DCCC 8, the ACC 10 and the DTR circuit 11, and these values are stored into the register 9. Next, in reproduction processing of digital signal stored in the memory 4, the processing starts with digital signal corresponding to the point when phase flag is changed from "0" to "1", utilizing correction values of control information stored in the register 9. For this reason, delay from when control start until controls become stable will be lost and reproduction processing can be performed.

Thus, with the above mentioned processing in reproduction processing of the digital signal, an area that would be data error from when DC control, amplitude control and phase control start to when these controls become stable is processed in reverse order, using control information of when controls are stable. That is, reproduction processing of a period from when controls become stable, to when control starts (in other words, when transition from an off-track state to an on-track state is detected) is done in reverse to detect recorded data.

Figure 8:
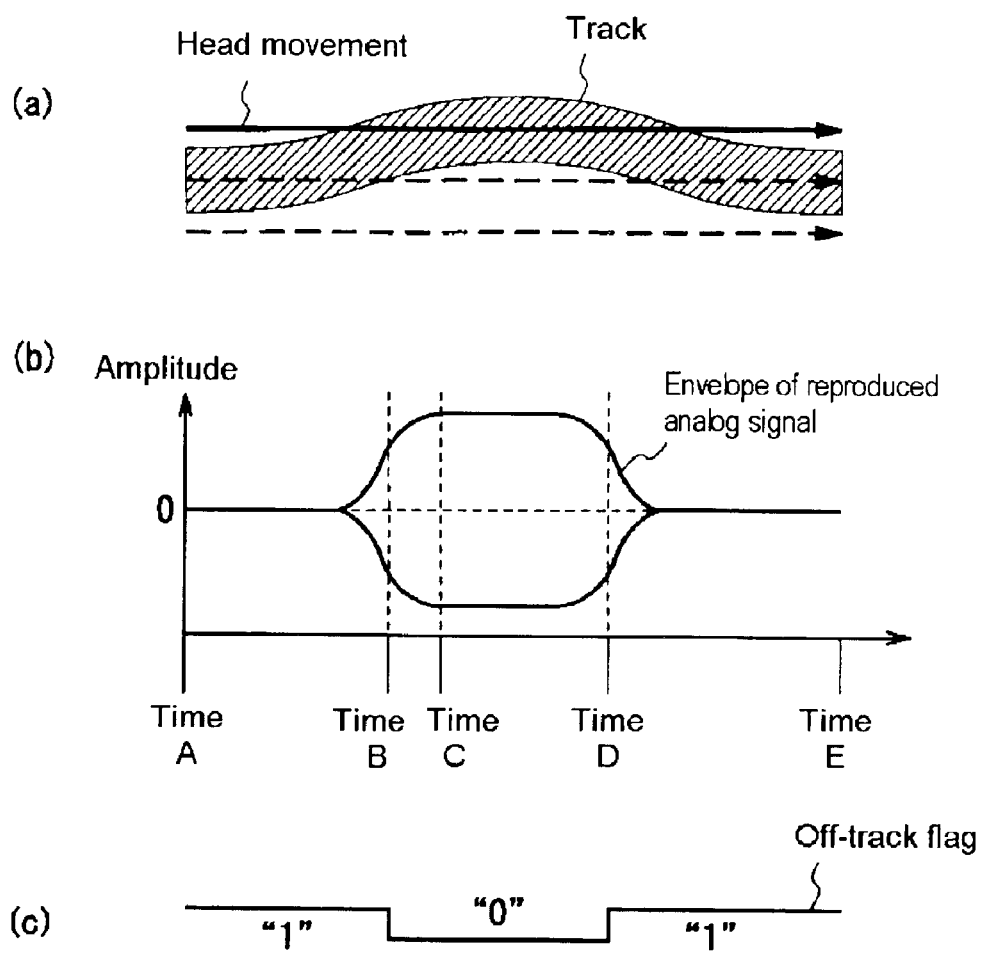
FIG. 8 is a diagram showing an example of relation between track shape and envelope of reproduced signal.

Next, reproducing operation of recorded data is described specifically with reference to FIG. 8.

In FIG. 8, FIG. 8(a) shows an example of a track that "track bending" occurs during data is written, and FIG. 8(b) shows an envelope of analog signal when the above-mentioned track is reproduced, and FIG. 8(c) shows shift of off-track flag.

From time A to time B, off-track state is detected by the off-track detector 5, and off-track flag "1" is outputted to the microprocessor 7, and switch signal is set to "1". At this time, reproduction processing is not performed because the off-track state occurs from the beginning of the data reading from a track.

At the time B, track condition changes from off-track to on-track. Off-track flag from the off-track detector 5 is changed from "1" to "0" accordingly. Switch signal is set to "0" by the microprocessor 7, and reproduction processing of the above-mentioned digital signal starts. At this time, the DCCC 8, the ACC 10 and the DTR circuit 11 start control processing respectively, and storing of the above-mentioned digital signal into the memory 4 starts simultaneously.

At the time C, each control processing of the DCCC 8, the ACC 10 and the DTR circuit 11 becomes stable, and phase flag supplied from the DTR circuit 11 changes from "0" to "1". At this moment, storing of digital signal into the memory 4 stops, and correction values of the DCCC 8, the ACC 10 and the DTR circuit 11 are stored in the register 9.

At the time D, track condition changes from on-track to off-track, and off-track flag supplied from the off-track detector 5 changes from "0" to "1". At this time, digital signal stored between the time B and the time C is outputted from the memory 4, and the microprocessor 7 sets switch signal to "1" and starts reproduction processing of the digital signal stored in the memory 4.

As described, in reproduction processing of digital signal outputted from the A/D converter 3, data error occurs from time B to time C, and recorded data is detected from time C to time D. On the other hand, in reproduction processing of the digital signal stored in the memory 4, recorded data from time B to time C is detected. In the end, recorded data is reproduced from the time B, when the off-track detector 5 determines that it is in on-track state, until time D. That is, recorded data in an area from the time B to the time C, where data error would occur due to control delay in normal reproduction processing, can become effective.

In the digital reproducing apparatus in accordance with the first embodiment, signal of an area where data error occurs due to control delay is stored in a memory, and reproduction processing of the stored signal is performed when an off-track state occurs. Therefore, even when tracking error occurs frequently because of narrow track pitch or when reproduction including adjacent track is performed such as non-tracking reproduction, reproduction processing of the area where data error occurs due to control delay can be performed without preventing sequential data reproduction operation (streaming operation).

Non-tracking reproduction is a reproduction method that once tracking is adjusted at a predetermined track position in each track pitch, then reproduction is performed with the fixed tracking. In this method, reproduction that influenced by adjacent track may occur, but data reproduction of the area where data error occurs due to control delay is possible by using the above-mentioned off-track detection. Especially in reproduction of a tape recorded in azimuth method, off-track state can be detected with little influence of adjacent track by placing a head in proximity to another head of different azimuth angle when reproducing data by moving the heads in an almost same track. This method corresponds to high-density recording.

In case of reproduction from a disc, non-tracking reproduction can also be used.

(The Second Embodiment)

Hereinafter, the second exemplary embodiment is described with reference to FIG. 2.

Figure 2:
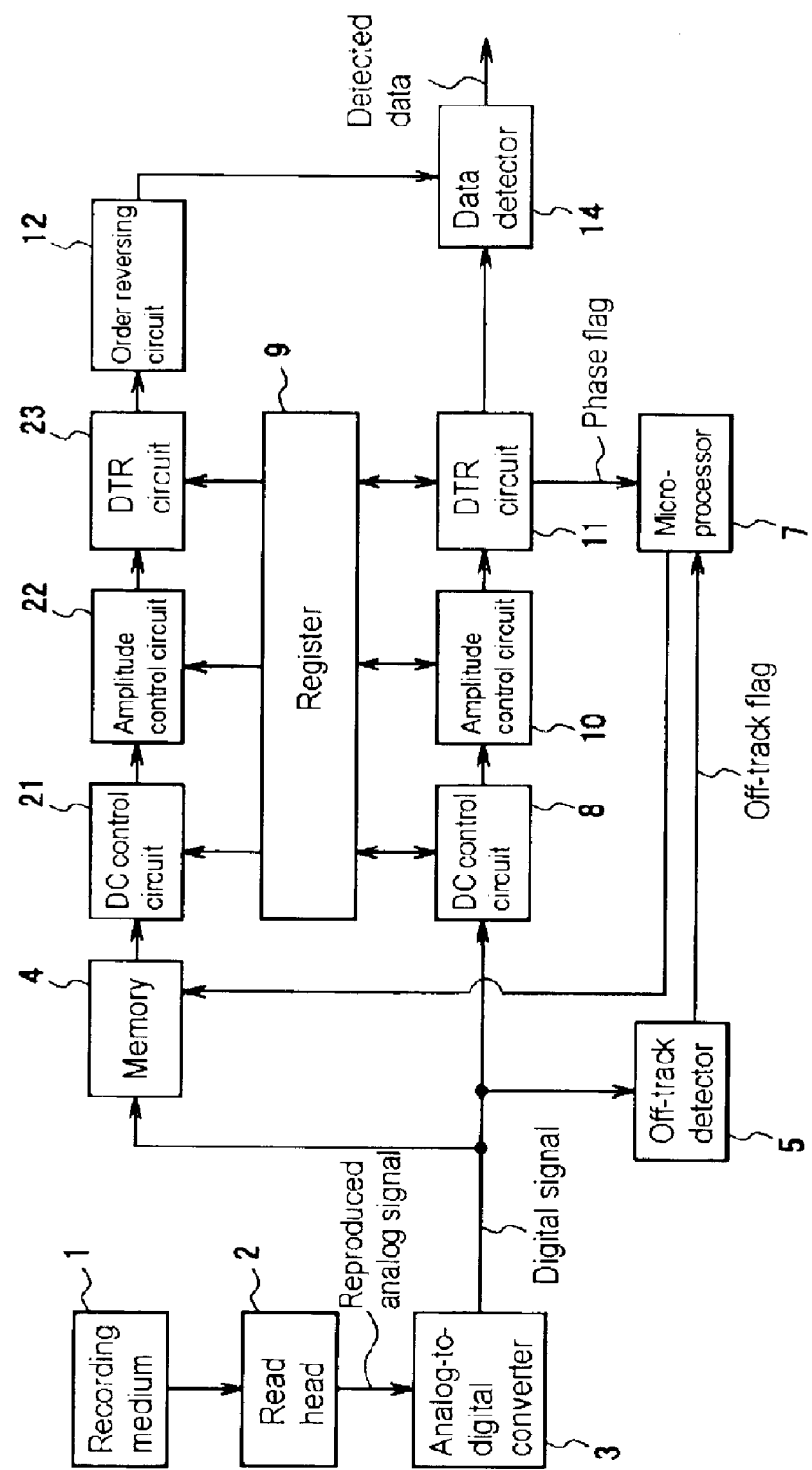
FIG. 2 is a block diagram showing a configuration of digital data reproducing apparatus according to a second exemplary embodiment of the present invention.

FIG. 2 shows a diagram of digital data reproducing apparatus configuration in accordance with this embodiment. Regarding the same or similar configuration presented in the first embodiment, detailed explanation is omitted and the same number as FIG. 1 is referred. The differences in configuration from the digital reproducing apparatus of the first embodiment are omission of the selector 6 and the selector 13, and addition of the direct current control circuit (DCCC) 21, amplitude control circuit (ACC) 22, and DTR circuit 23. In addition, the DCCC 8 and the DCCC 21, the ACC 10 and the ACC 22, and the DTR circuit 11 and the DTR circuit 23, are the same configuration respectively.

In FIG. 2, detection of recorded data in the digital signal outputted from A/D converter 3 is performed using the DCCC 8, the ACC 10, the DTR circuit 11 and the data detector 14. When off-track flag is changed from "1" to "0", the microprocessor 7 issues a store command to the memory 4 and the memory 4 starts to store the above mentioned digital signal. Next, when phase flag supplied from the DTR circuit 11 is changed from "0" to "1", the microprocessor 7 issues a read command, and the stored digital signal is read out from the memory 4 and supplied to the DCCC 21. Before that, storing of digital signal into the memory 4 is stopped, and each correction value of the DCCC 8, the ACC 10 and the DTR circuit 11 are stored into register 9 based on a command for storing these correction values from the microprocessor 7. Then, the stored digital signal is read out from the memory 4 and outputted to the DCCC21.

That is, when phase flag is changed from "0" to "1", storing operation to the memory 4 is stopped at first. Then each correction value of correction means is stored in register 9. After that, reading operation of memory 4 starts using correction values stored in the register 9.

In the DCCC 21, the ACC 22, and the DTR circuit 23, each control processing starts using correction value supplied from register 9. In addition, as well as the first embodiment, digital signal stored in memory 4 is outputted in the reverse order, and after processing in the DCCC 21, the ACC 22 and the DTR circuit 23, order is reversed to the original order in the order reversing circuit 12, and supplied to data detector 14 to perform detection of recorded data.

With above-mentioned processing, it is possible to perform reproduction processing of digital signal supplied directly from A/D converter 3 simultaneously with reproduction processing of digital signal stored in memory 4. In reproduction processing of the signal supplied directly from A/D converter 3, in an area where data error occurs from when DC control, amplitude control and phase control start until these controls become stable, detection of recorded data can be performed using control information of when controls become stable.

In a digital data reproducing apparatus in accordance with this embodiment, reproduction processing of the digital signal and reproduction processing of an area where data error occurs due to control delay are performed in parallel. Therefore, even when tracking error occurs frequently because of narrow track pitch or when reproduction including adjacent track is performed such as non-tracking reproduction, re-processing of data error area caused by control delay can be performed without preventing sequential data reproduction operation (streaming operation).

(The Third Embodiment)

Hereinafter, the third exemplary embodiment is explained with reference to FIGS. 3 and 8.

Figure 3:
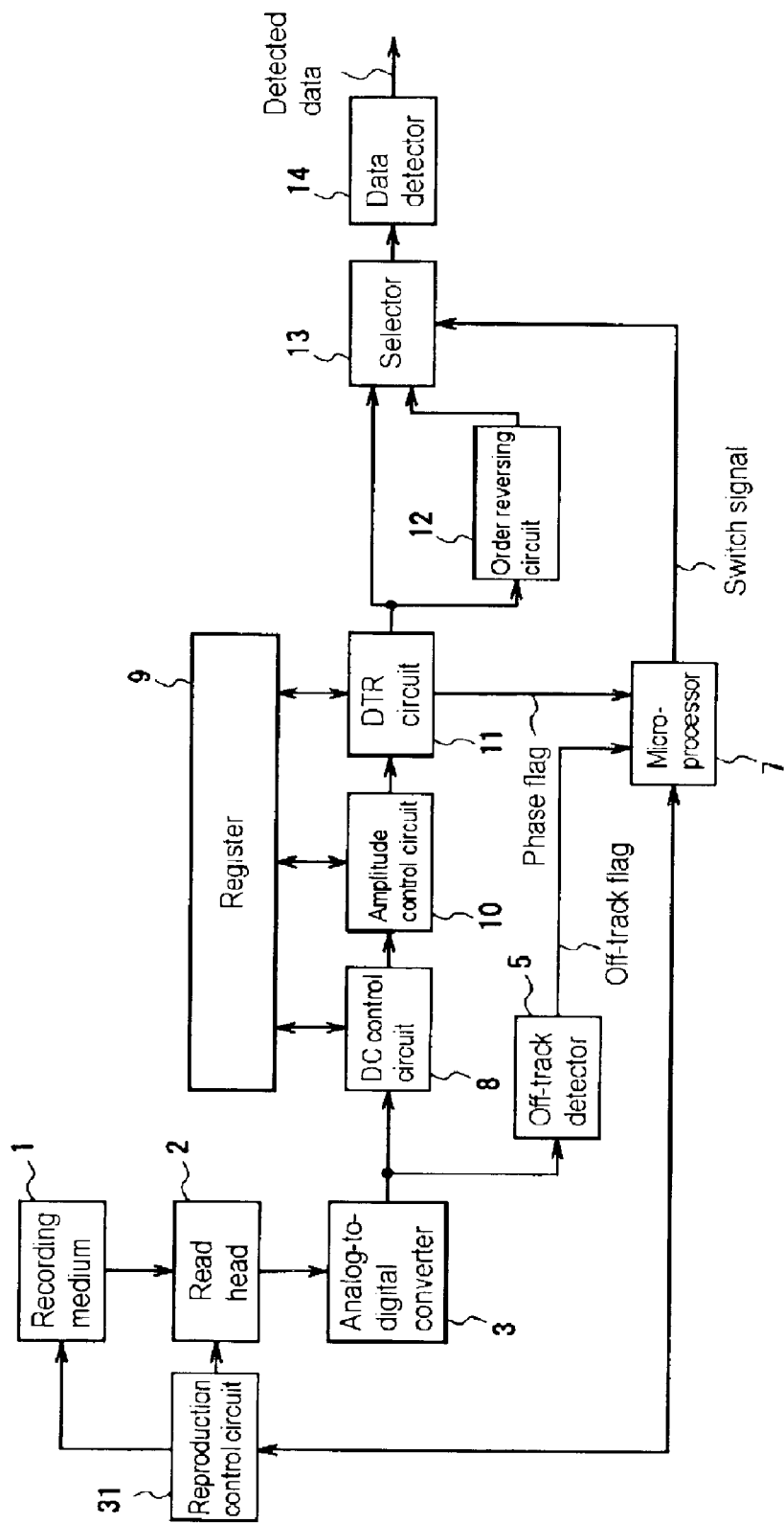
FIG. 3 is a block diagram showing a configuration of digital data reproducing apparatus according to a third exemplary embodiment of the present invention.

FIG. 3 is a diagram showing configuration of a digital data reproducing apparatus in accordance with this embodiment. In FIG. 3, regarding the same or similar constitution presented in the first embodiment, detailed explanation is omitted and the same number as FIG. 1 is referred.

Differences in configuration from the digital data reproducing apparatus of the first embodiment are omission of the memory 4 for storing signal from the A/D converter 3, and the selector 6 for selecting signal from the A/D converter 3 or signal from the memory 4, and addition of reproduction control circuit 31 which enables to reproduce a track on the recording medium 1 in the reverse direction as well as in the forward direction.

In FIG. 3, the reproduction control circuit 31 controls a recording medium 1 and the read head 2 so that a track on the recording medium 1 specified by the microprocessor 7 can be reproduced in both forward and reverse directions.

Operation of a digital data reproducing apparatus with above-mentioned configuration is explained.

Normally, a track on the recording medium 1 is read out in forward direction and the read data is converted to the digital signal by the A/D converter 3. The microprocessor 7 sets switch signal to "0", and recorded data is detected from the digital signal using the DCCC 8, the ACC 10, the DTR circuit 11, and data detector 14.

While the above-mentioned data reproduction processing is performed, if off-track flag is changed from "1" to "0", the microprocessor 7 decides to reproduce the track which is being processed in reverse direction. Then, when phase flag is changed from "0" to "1" after off-track flag is changed from "1" to "0", the microprocessor 7 directs the register 9 to store correction values of the DCCC 8, the ACC 10 and the DTR circuit 11. When the reproduction of the above-mentioned track ends, the microprocessor 7 directs the reproduction control circuit 31 to reproduce the track in reverse direction. Concurrently, the microprocessor 7 sets switch signal to "1" and detects recorded data from the digital signal reproduced in the reverse order, using the DCCC 8, the ACC 10, the DTR circuit 11, the order reversing circuit 12, and the data detector 14.

Here, processing procedure of the digital signal reproduced in the reverse direction from the track using the DCCC 8, the ACC 10, the DTR circuit 11 and the order reversing circuit 12 is the same as that of the signal stored in the memory 4 described in the first embodiment.

In case that track shown in FIG. 8 is reproduced, in normal data reproduction, the reproduced signal is supplied to the A/D converter 3 from time A shown in FIG. 8(*c*) in order and detection of recorded data is performed. At time B, because off-track flag is changed from "1" to "0", the microprocessor 7 decides to perform data reproduction in the reverse direction. When phase flag is changed from "0" to "1" at time C, the microprocessor 7 directs the register 9 to store correction values. Then, when reproduction of the track completes, the microprocessor 7 sets switch signal to "1", and makes the reproduction control circuit 31 start reproduction in the reverse direction. When the track is reproduced in the reverse direction, the reproduced signal is supplied to the A/D converter 3 in order from time E to time A of FIG. 8(*c*) and detection of recorded data is performed. Recorded data from time C to time D is detected in normal data reproduction, and recorded data from when controls become stable after time D, to time B, is detected in the reverse direction reproduction. Finally, twice of data reproduction in forward and reverse directions enables reproduction of recorded data from time B to time D.

That is, valid data can be obtained by reading out correction values stored in the register 9 as when correction circuits are stable condition in the forward direction reproduction, and then by reproducing signal from time C to time B in the reverse direction using the read correction values.

In a digital data reproducing apparatus in accordance with this embodiment, data reproduction processing in both forward direction and reverse direction are performed. Therefore, even when tracking error occurs frequently due to narrow track pitch, or when reproduction including adjacent track is performed such as non-tracking reproduction, re-processing of data error area caused by control delay can be performed without using memory for storing digital data from time B to time C described above.

(The Fourth Embodiment)

Hereinafter, regarding a digital data reproducing apparatus in accordance with the fourth embodiment, configuration of an order reversing circuit and reproduction processing using a synchronization pattern in digital data are explained with reference to FIGS. 4 and 9.

Figure 4:
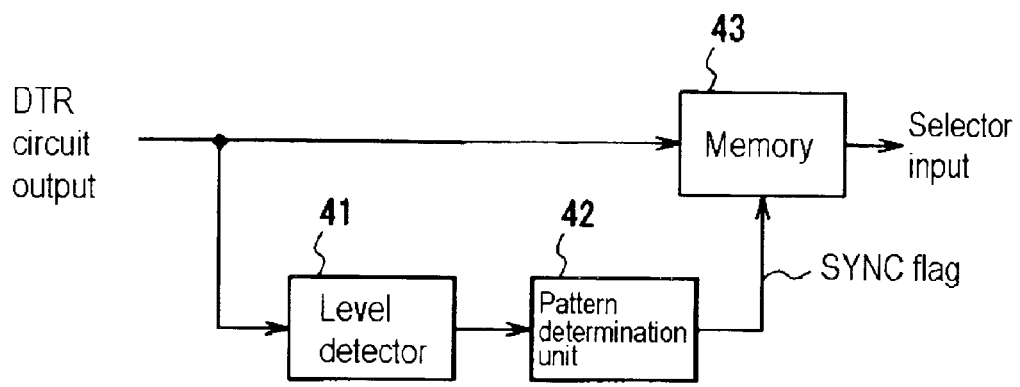
FIG. 4 is a block diagram showing a configuration of order reversing circuit.

FIG. 4 is a diagram showing configuration of the order reversing circuit 12, and the order reversing circuit 12 includes level detector 41, pattern determination unit 42, and memory unit (memory) 43.

In FIG. 4, the level detector 41 detects level of a signal supplied to the order reversing circuit 12 (from DTR circuit) using a predetermined threshold value, and converts the signal into binary data. The pattern determination unit 42 searches binary data sequence which is outputted from the level detector 41 for a pattern that conforms to a synchronization pattern, and outputs to the memory 43 as a synchronization flag signal (SYNC flag). In addition, the SYNC flag is "1" only when synchronization pattern is detected, and otherwise SYNC flag is set to "0". Because order of the binary data sequence supplied to the pattern determination unit 42 is reverse to the order of the recorded data, the pattern determination unit 42 is configured to search and determine a synchronization pattern inputted in the reverse order.

The memory 43 is a similar configuration with that of the memory 4 shown in FIG. 1, but its storing operation is controlled by control signals of off-track flag, phase flag and SYNC flag.

Operation of the order reversing circuit configured as mentioned above is explained.

Input signal inputted into the order reversing circuit 12 is supplied to the memory 43 and the level detector 41.

The memory 43 stores signal supplied to the memory 43. Signal supplied to the level detector 41 is digitalized and outputted to the pattern determination unit 42, and then synchronization pattern is detected. When synchronization pattern is detected in the pattern determination unit 42, SYNC flag become "1" and signal stored in the memory 43 is outputted in the order reversed to the input order.

In order to obtain digital data volume that the order reversing circuit 12 has to process, data volume that memory 4 stores can be determined by counting sampling clock. Then, number of the synchronization pattern of the digital data corresponding to block number of data error volume caused by control delay can be obtained. As a result, the memory 43 stores digital data from time B until the counted number of synchronization pattern, outputs the digital data in the reverse order.

Hereinafter, operation of a digital data reproducing apparatus having the order reversing circuit 12 shown in FIG. 4.

Figure 9:
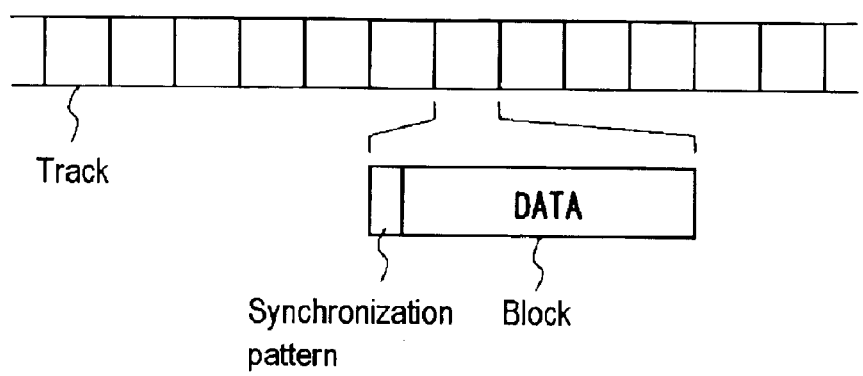
FIG. 9 is a diagram showing an example of a track format, off-track flag and phase flag of recorded data.
Figure 9:
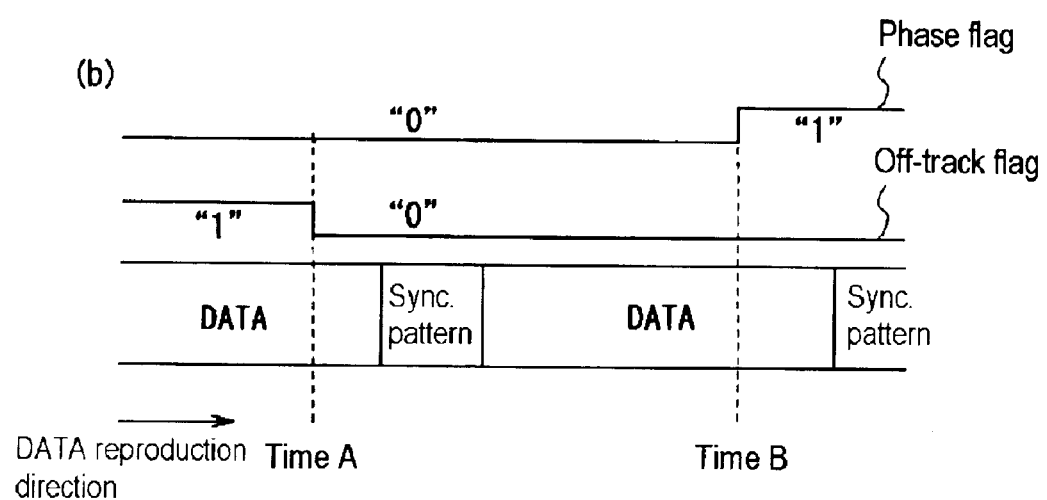
Figure 10:
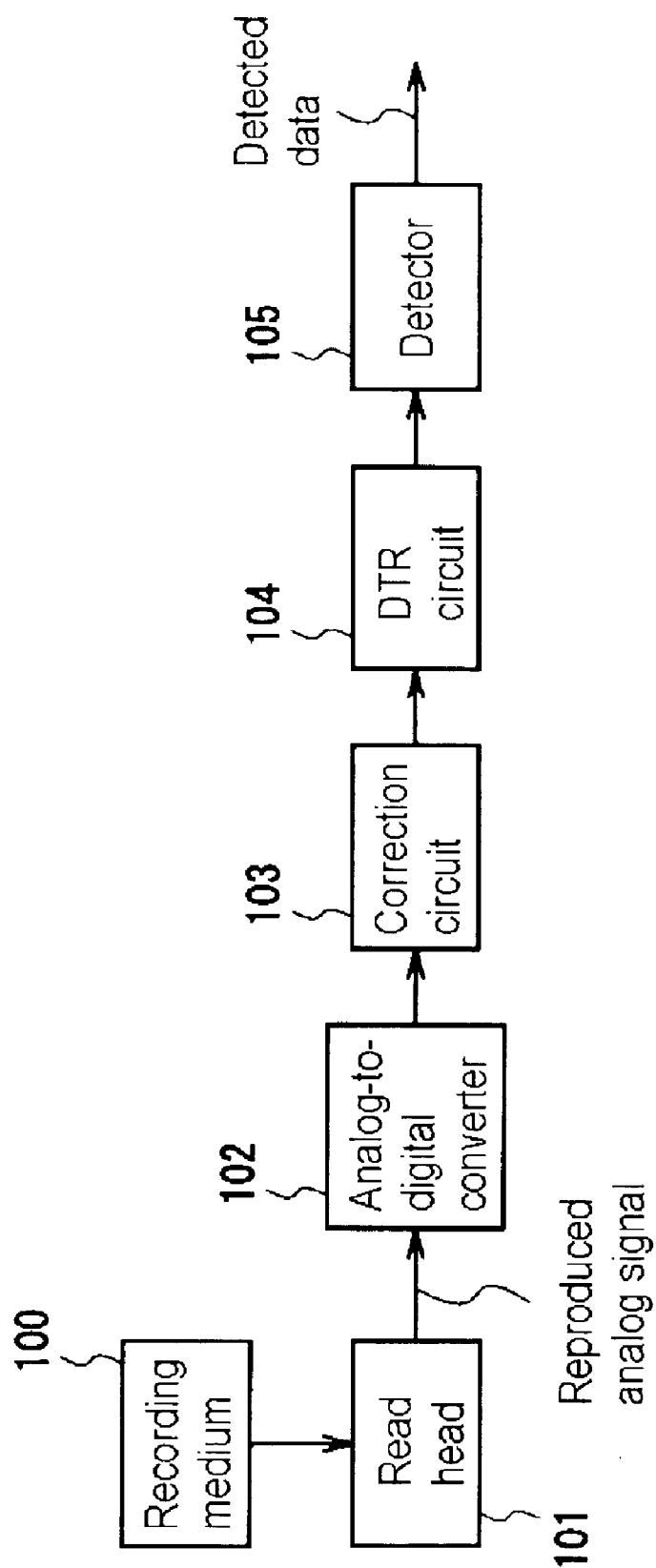
FIG. 10 is a diagram showing a configuration example of a conventional digital data reproducing apparatus.

For example, as shown in FIG. 9(*a*), a case that a track has a plurality of blocks that consists of a synchronization pattern and data area respectively is explained. In other words, synchronization pattern and data area are united and effective data is constituted. In case when off-track state occurs during reproduction of such track, and off-track flag is changed from "1" to "0" at time A, and then phase flag is changed from "0" to "1" at time B, as shown in FIG. 9(*b*), signal from time B to time A is supplied into the order reversing circuit 12. Here, in case when synchronization pattern is detected and output start of the memory 43 is controlled, signal from synchronization pattern until time B is outputted in order after storing a necessary area from time B until synchronization pattern. Herewith, it becomes unnecessary to perform processing of storing and outputting signal from time A until synchronization pattern. As a result, processing time of the order reversing can be shortened.

In data format that a track including plurality of blocks which synchronization pattern and data area are united, if track bending is occurred, off-track state occurs periodically. In this case, it is useful to shorten processing time for order reversing.

In a digital data reproducing apparatus in accordance with this embodiment, synchronization pattern contained in reproduction signal is detected and an area of order change is controlled. Therefore, it becomes possible to shorten a time to take re-processing of an area where data error occurs due to control delay.

In addition, there may be a case that it takes a long time from when condition becomes on-track to rise up to the stable condition which is expressed by phase flag "1", depending on a variation condition of the digital signal. Also, the order reversing circuit 12 can detect synchronization pattern during data processing data of signal supplied directly from the A/D converter 3, and if synchronization pattern is detected, the circuit 12 outputs SYNC flag. Therefore, such configuration is possible that controls storing operation by stopping storing operation of the memory 4, if a phase flag supplied from the DTR circuit 11 or a SYNC flag is detected. As a result, time for reproduction processing as a whole can be shortened. In addition, other configurations are also possible such that SYNC flag is outputted when synchronization pattern is detected sequentially, and that the synchronization pattern and phase flag is connected as OR-connection for detecting a predetermined stable state. That is, configuration is possible that stops storing operation of the memory 4 when either one of phase flag or SYNC flag is detected.

As explained above, a digital data reproducing apparatus in accordance with the present invention is possible to reproduce an area that data error would occur due to control delay.

In addition, decrease in memory capacity usage and shortening of processing time can be achieved by storing digital signal in the order reversing circuit from when phase flag is detected to when synchronization pattern is detected.

It also becomes possible to omit memory for digital signal and to process correction of an area, which would be data error due to control delay, in the reverse direction, by performing reproduction in both forward direction and reverse direction. Moreover, reproduction processing time can be shortened by determining detection of a predetermined stable state by using both phase flag and SYNC flag.

The present invention has been described with reference to specific embodiments. However, such embodiments are not intended to limit the scope of the claims appended hereto. It will be apparent to those skilled in the art that modifications may be made in the embodiment chosen for illustration without departing from the spirit and scope of the invention.

What is claimed is:

1. A digital data reproducing apparatus, comprising:
   a read head for reading data from a recording medium;
   an analog-to-digital converter for converting the data read by said read head into digital data;
   a memory for storing the digital data;
   a phase control circuit for controlling phase of the digital data to generate a phase flag signal which is representative of a state of phase synchronization;
   an off-track detector for detecting off-track of said read head from a record track on the recording medium to generate an off-track flag signal; and
   a control unit for controlling said memory in accordance with the phase flag signal and the off-track flag signal
   wherein said memory stores the digital data for a period from when said off-track detector detects a transition from an off-track state to an on-track state, to when said phase control circuit starts to provide the phase flag signal representative of stable phase control.

2. A digital data reproducing apparatus, comprising:

a read head for reading data from a recording medium;

an analog-to-digital converter for converting the data read by said read head into digital data;

a memory for storing the digital data;

an off-track detector for detecting off-track of said read head from a record track on the recording medium to generate an off-track flag signal;

a correction circuit for generating a correction value which is used in correction processing and a phase flag signal representative of a predetermined phase synchronization status;

a register for storing the correction value;

an order reversing circuit for rearranging the digital data read from said memory and then corrected by said correction circuit using the correction value read from said register, in an order contrary to the order in which the digital data is read from said memory; and a control unit for controlling said memory in accordance with the off-track flag signal and the phase flag signal wherein said memory stores the digital data for a period from when said off-track detector detects a transition from an off-track state to an on-track state, to when said correction circuit starts to provide the phase flag signal representative of a stable state of said correction circuit.

3. A digital data reproducing apparatus, comprising:

a read head for reading data from a recording medium;

an analog-to-digital converter for converting the data read by said read head into digital data;

a memory for storing the digital data;

an off-track detector for detecting off-track of said read head from a record track on the recording medium to generate an off-track flag signal;

a correction circuit for generating a correction value which is used in correction processing and a phase flag signal representative of a predetermined phase synchronization status;

a register for storing the correction value;

an order reversing circuit for rearranging the digital data read from said memory and then corrected by said correction circuit using the correction value read from said register, in an order contrary to the order in which the digital data is read from said memory; and a control unit for controlling said memory in accordance with the off-track flag signal and the phase flag signal.

wherein the digital data is read from said memory in an order contrary to the order in which the digital data is stored into said memory.

4. A digital data reproducing apparatus, comprising:

a read head for reading data from a recording medium;

an analog-to-digital converter for converting the data ready by said read head into digital data;

a memory for storing the digital data;

an off-track detector for detecting off-track of said read head from a record track on the recording medium to generate an off-track flag signal;

a correction circuit for generating a correction value which is used in correction processing and a phase flag signal representative of a predetermined phase synchronization status;

a register for storing the correction value;

an order reversing circuit for rearranging the digital data read from said memory and then corrected by said correction circuit using the correction value read from said register, in an order contrary to the order in which the digital data is read from said memory; and a control unit for controlling said memory in accordance with the off-track flag signal and the phase flag signal wherein said order reversing circuit comprises:

a memory unit for storing the digital data supplied to said order reversing circuit; and a pattern determination unit for detecting a predetermined synchronization pattern in the digital data supplied to said memory unit, to provide a synchronization flag signal when the predetermined synchronization pattern is detected, wherein said order reversing circuit processes the digital data for a period between a time point when said correction circuit generates the phase flag signal representative of the predetermined stable state, and a time point when the synchronization pattern is detected.

5. A digital data reproducing apparatus, comprising:

a read head for reading data from a recording medium;

an analog-to-digital converter for converting the data ready by said read head into digital data;

a memory for storing the digital data;

an off-track detector for detecting off-track of said read head from a record track on the recording medium to generate an off-track flag signal;

a correction circuit for generating a correction value which is used in correction processing and a phase flag signal representative of a predetermined phase synchronization status;

a register for storing the correction value;

an order reversing circuit for rearranging the digital data read from said memory and then corrected by said correction circuit using the correction value read from said register, in an order contrary to the order in which the digital data is read from said memory; and a control unit for controlling said memory in accordance with the off-track flag signal and the phase flag signal wherein said order reversing circuit comprises:

a memory unit for storing the digital data supplied to said order reversing circuit; and a pattern determination unit for detecting a predetermined synchronization pattern in the digital data supplied to said memory unit, to provide a synchronization flag signal when the predetermined synchronization pattern is detected, wherein the digital data is supplied to said order reversing circuit for a period between a time point when said phase flag signal representative of the predetermined stable state is generated and a time point when the synchronization pattern is detected, and said order reversing circuit rearranges the supplied digital data in an order contrary to the order in which the digital data is supplied to said order reversing circuit.

6. A digital data reproducing apparatus, comprising:

a read head for reading data from a recording medium;

an analog-to-digital converter for converting the data read by said read head into digital data;

a first correction circuit for generating a correction value that is to be used to correct the digital data supplied directly from said analog-to-digital converter;

a register for storing the correction value;

a memory for storing the digital data supplied from said analog-to-digital converter;

a second correction circuit for correcting the digital data stored in said memory;

an order reversing circuit for rearranging the digital data supplied from said second correction circuit, in reverse order of time; and an off-track detector for detecting off-track of said read head from a recorded track on the recording medium, wherein (a) said memory stores the digital data for a period from when said off-track detector detects a transition from an off-track state to an on-track state, to when said first correction circuit comes to a predetermined stable state, thereafter, (b) the digital data stored in said memory is read in an order contrary to the order in which the digital data is stored, and then corrected by using the correction value, and (c) the order of the corrected digital data is reversed in said order reversing circuit wherein said order reversing circuit comprises:

a memory unit for storing the digital data supplied to said order reversing circuit; and a pattern determination unit for detecting a predetermined synchronization pattern in the digital data supplied to said memory unit, to provide a synchronization flag signal when the predetermined synchronization pattern is detected, wherein said order reversing circuit processes the digital data for a period between the time point when said first correction circuit comes to the predetermined stable state, and a time point when the synchronization pattern is detected.

7. A digital data reproducing apparatus, comprising:

a read head for reading data from a recording medium;

an analog-to-digital converter for converting the data read by said read head into digital data;

a first correction circuit for generating a correction value that is to be used to correct the digital data supplied directly from said analog-to-digital converter;

a register for storing the correction value;

a memory for storing the digital data supplied from said analog-to-digital converter;

a second correction circuit for correcting the digital data stored in said memory;

an order reversing circuit for rearranging the digital data supplied from said second correction circuit, in reverse order of time; and an off-track detector for detecting off-track of said read head from a recorded track on the recording medium, wherein (a) said memory stores the digital data for a period from when said off-track detector detects a transition from an off-track state to an on-track state, to when said first correction circuit comes to a predetermined stable state, thereafter, (b) the digital data stored in said memory is read in an order contrary to the order in which the digital data is stored, and then corrected by using the correction value, and (c) the order of the corrected digital data is reversed in said order reversing circuit wherein said order reversing circuit comprises:

a memory unit for storing the digital data supplied to said order reversing circuit; and a pattern determination unit for detecting a predetermined synchronization pattern in the digital data supplied to said memory unit, to provide a synchronization flag signal when the predetermined synchronization pattern is detected, wherein the digital data is supplied to said order reversing circuit for a period between the time point when said first correction circuit comes to the predetermined stable state and a time point when the synchronization pattern is detected, and said order reversing circuit rearranges the supplied digital data in an order contrary to the order in which the digital data is supplied to said order reversing circuit.

8. A digital data reproducing apparatus, comprising:

a read head for reading data from a recording medium;

a reproduction control circuit for controlling the recording medium and said read head for reproduction of the data on a record track of the recording medium in forward and reverse directions;

an analog-to-digital converter for converting the data read by said read head into digital data;

an off-track detector for detecting off-track of said read head from the record track on the recording medium;

a correction circuit for correcting the digital data, and for generating a correction value;

a register for storing the correction value; and an order reversing circuit for rearranging the digital data supplied from said correction circuit in reverse order of time;

wherein, (a) in the forward reproduction of the data on the record track, when said correction circuit comes to a predetermined stable state after said off-track detector detects a transition from an off-track state to an on-track state, the correction value under the stable state of said correction circuit is stored into said register; (b) after said forward reproduction is completed, said reproduction control circuit provides the reverse reproduction of the data on the record track, with the correction value stored in said register used as an initial value of said correction; and (c) said order reversing circuit reverses the order of the data obtained in said reverse reproduction wherein said order reversing circuit comprises:

a memory for storing the digital data supplied to said order reversing circuit; and a pattern determination unit for detecting a predetermined synchronization pattern in the digital data supplied to said memory, to provide a synchronization flag signal when the predetermined synchronization pattern is detected, wherein said order reversing circuit processes the digital data for a period between a time point when said correction circuit comes to the predetermined stable state, and a time point when the synchronization pattern is detected.

9. A digital data reproducing apparatus, comprising:

a read head for reading data from a recording medium;

a reproduction control circuit for controlling the recording medium and said read head for reproduction of the data on a record track of the recording medium in forward and reverse directions;

an analog-to-digital converter for converting the data read by said read head into digital data;

an off-track detector for detecting off-track of said read head from the record track on the recording medium;

a correction circuit for correcting the digital data, and for generating a correction value;

a register for storing the correction value; and an order reversing circuit for rearranging the digital data supplied from said correction circuit in reverse order of time;

wherein, (a) in the forward reproduction of the data on the record track, when said correction circuit comes to a predetermined stable state after said off-track detector detects a transition from an off-track state to an on-track state, the correction value under the stable state of said correction circuit is stored into said register; (b) after said forward reproduction is completed, said reproduction control circuit provides the reverse reproduction of the data on the record track, with the correction value stored in said register used as an initial value of said correction; and (c) said order reversing circuit reverses the order of the data obtained in said reverse reproduction wherein said order reversing circuit comprises:

a memory for storing the digital data supplied to said order reversing circuit; and a pattern determination unit for detecting a predetermined synchronization pattern in the digital data supplied to said memory, to provide a synchronization flat, signal when the predetermined synchronization pattern is detected, wherein the digital data is supplied to said order reversing circuit for a period between a time point when said correction circuit comes to the predetermined stable state and a time point when the synchronization pattern is detected, and said order reversing circuit rearranges the supplied digital data in an order contrary to the order in which the digital data is supplied to said order reversing circuit.

* * * * *

UNITED STATES PATENT AND TRADEMARK OFFICE
CERTIFICATE OF CORRECTION

PATENT NO. : 6,934,099 B2
DATED : August 23, 2005
INVENTOR(S) : Yoshimasa Oda et al.

It is certified that error appears in the above-identified patent and that said Letters Patent is hereby corrected as shown below:

Column 13,
Line 45, delete "." and insert -- , --.

Column 18,
Line 3, delete "flat," and insert -- flag --.

Signed and Sealed this

Third Day of January, 2006

JON W. DUDAS
*Director of the United States Patent and Trademark Office*